(12) United States Patent
Chavez

(10) Patent No.: US 12,384,525 B1
(45) Date of Patent: Aug. 12, 2025

(54) TAILORED STRUCTURAL ACTUATION SYSTEM

(71) Applicant: Raytheon Company, Arlington, VA (US)

(72) Inventor: Alexander E. Chavez, Lawndale, CA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/647,813

(22) Filed: Apr. 26, 2024

(51) Int. Cl.
| | |
|---|---|
| *B64C 13/26* | (2006.01) |
| *B64C 9/00* | (2006.01) |
| *B64C 9/02* | (2006.01) |
| *B64D 45/00* | (2006.01) |

(52) U.S. Cl.
CPC ............. *B64C 13/26* (2013.01); *B64C 9/02* (2013.01); *B64D 45/00* (2013.01); *B64C 2009/005* (2013.01)

(58) Field of Classification Search
CPC ..... B64C 13/26; B64C 9/02; B64C 2009/005; B64D 45/00
See application file for complete search history.

(56) References Cited

U.S. PATENT DOCUMENTS

| | | | | |
|---|---|---|---|---|
| 5,489,830 | A | * | 2/1996 | Fernandez ............... B64C 13/18 318/584 |
| 6,499,952 | B1 | * | 12/2002 | Jacot .................... F03G 7/06146 60/527 |
| 2008/0258015 | A1 | * | 10/2008 | Thanhofer ................ B64C 9/02 244/224 |
| 2018/0340571 | A1 | * | 11/2018 | Ayyagari ................ F16C 35/02 |

* cited by examiner

*Primary Examiner* — Rodney A Bonnette
(74) *Attorney, Agent, or Firm* — Schwegman Lundberg & Woessner, P.A.

(57) ABSTRACT

A device may include a locking assembly configured for coupling with an aileron of an aircraft, the locking assembly includes a lock configured for coupling with the aileron. The locking assembly may include a lock mechanism operatively coupled with the lock and in communication with an accelerometer, where the lock mechanism is configured to transition the lock from a locked configuration to a released configuration. The lock mechanism opens the lock based on a specified acceleration measured with the accelerometer, and the lock frees the aileron to a dynamic configuration. A device may include a tailored aileron deployment system including a biasing member coupled with the aileron, in the released configuration the biasing member controls movement of the aileron in the dynamic configuration.

20 Claims, 6 Drawing Sheets

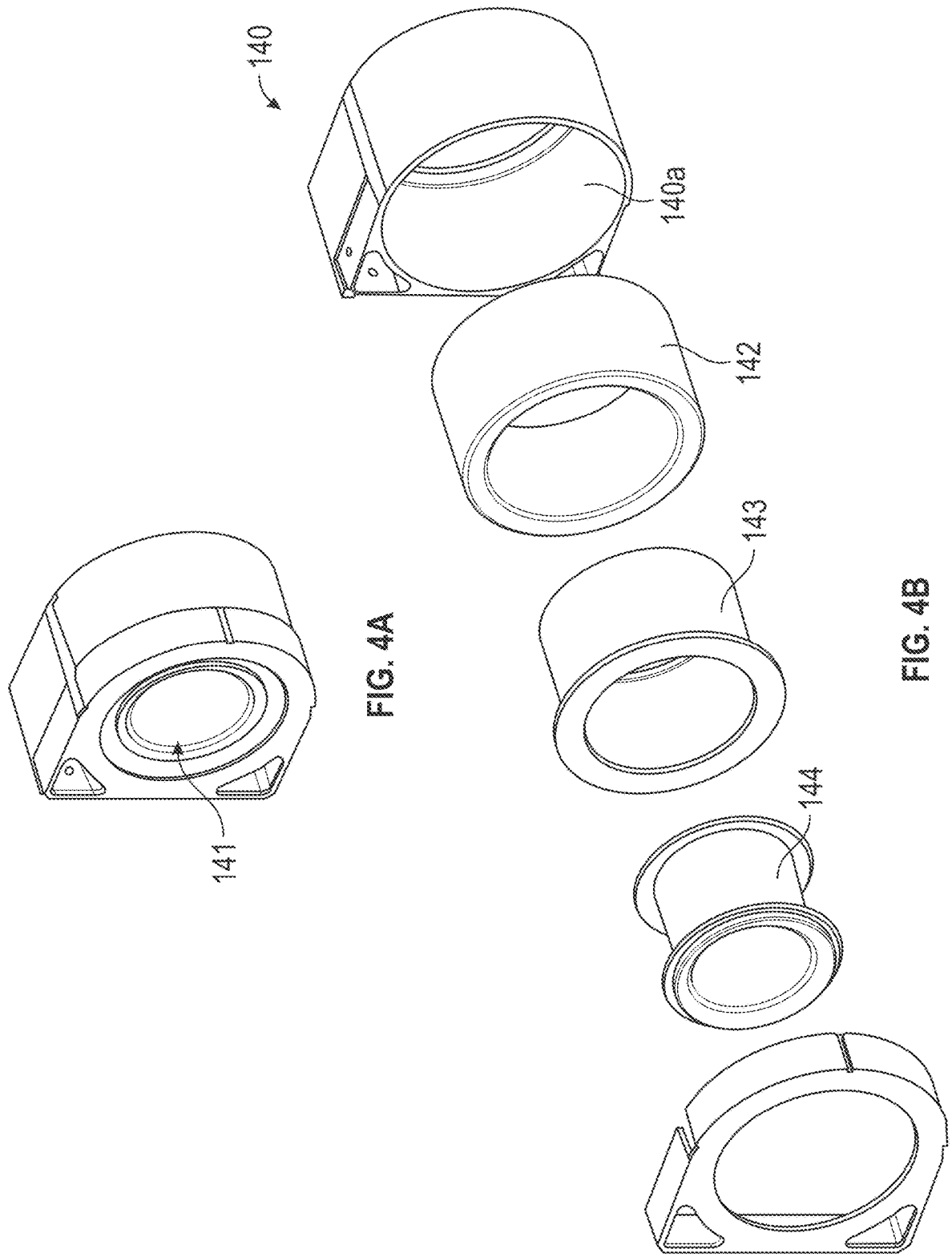

TAILORED STRUCTURAL ACTUATION SYSTEM

BACKGROUND

Traditional actuation systems for control surfaces in wings are complex, requiring power lines, hydraulic lines, heavy actuators, and power from an auxiliary power unit. Inside confined spaces of aircraft wings there are actuators, along with their plumbing and wiring, to assist in operating control surfaces such as wing flaps and ailerons.

Ailerons are hinged flight control surfaces attached to the trailing edge of the wings of a fixed-wing aircraft. Ailerons are usually found near the wingtips. Traditional ailerons extend along the outboard trailing edges of each wing. Some larger aircraft have two sets of ailerons, one near the wingtip and another inboard, to increase roll control authority.

Ailerons are part of a roll control system and are used to control the aircraft's roll about the aircraft's longitudinal axis. To control the aircraft's roll, the ailerons are moved up or down. For example, when one aileron is raised, the other is lowered, and vice versa. This differential movement changes the lift distribution between the left and right wings, causing the aircraft to roll to the side with the lowered aileron.

Ailerons work change the shape of the wing such that when an aileron is deflected down, the angle of attack increases causing wing will make more lift. More lift alters the angle of the wing such that the wing will start going up and the other wing is angled downward.

SUMMARY

Ailerons change the effective shape of the airfoil of the wing. For example, changing the angle of deflection at a trailing end of a wing changes the amount of lift generated by the airfoil. For instance, with a greater downward deflection, the lift will increase in the upward direction. The ailerons can be actuated mechanically through cables and pulleys, hydraulically, or by using fly-by-wire systems where electronic signals control actuators that move the ailerons. At times, these systems often do not fit within the aircraft's mold line, necessitating additional fairings that can result in undesirable aerodynamic effects.

The inventors have recognized a system for minimizing the control systems used for controlling an aileron. The inventors have recognized a system that includes fewer components for controlling an aileron and optionally decreasing the amount of space occupied by the control systems. For example, the inventors have recognized a system that does not use mechanics such as hydraulics, powered actuators, cables, pulleys or the like to control or manage a deflection or movement of an aileron. In examples the control system utilizes the aerodynamic load on the aileron to induce the desired deflection of the aileron. The desired deflection can be controlled or managed using a biasing element extending within the wing. In examples, the biasing element is preloaded with tailored, or specified, load to effectively control or manage movement of an aileron, such as a target deflection.

In an example, the aileron is locked in place in a stowed configuration and transitions to an unlocked configuration when specific gravitational forces ("G force") or centrifugal forces are recognized by an accelerometer. For example, a locking assembly is coupled with the aileron. The locking assembly, for example, includes a lock that is coupled with at least a portion of the aileron and an accelerometer. A locking mechanism is optionally operatively coupled with the lock and in communication with an accelerometer.

In examples, tailored aileron deployment system assembly, and associated management system, includes the locking assembly with the accelerometer that measures the aircraft's acceleration. The acceleration is, for example, related to a specific force such as a gravitational force or centrifugal force. The accelerometer is coupled with a control system that, for example, detects a threshold force and maintains the locking assembly in a locked configuration until the threshold acceleration is measured or the threshold force is detected. The locking assembly includes, for example, the lock mechanism. The lock mechanism is operatively coupled with a lock such that the lock retains the aileron in a neutral orientation, when activated by the locking mechanism, releases the aileron to deflect. For example, the locking mechanism transitions from locked to released configuration based on acceleration, allowing the aileron to move from a static to a dynamic configuration.

When the aileron is in a dynamic configuration, the angle of deflection or rotation of the aileron is optionally controlled or managed by a biasing member. In examples, the biasing member is able to deflect and rotate according to the angle of deflection of the aileron.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE DRAWINGS

FIG. 4A illustrates a brace for an aileron control assembly according to at least one example of the present disclosure.

FIG. 4B illustrates an exploded view for of a brace an aileron control assembly according to at least one example of the present disclosure.

DETAILED DESCRIPTION

Accommodating actuators and associated plumbing and wiring inside of wings an aircraft can present challenges due to the space allowed in the wing. At times this fit is more challenging proximate to a wing tip of a wing where ailerons of aircraft are located. For example, a challenge is presented to fit actuators, and associated plumbing and wiring for ailerons and exterior control components in the limited volume within the wing proximate to the wing tip. In some examples, systems to actuate control surfaces in the wing include power lines, hydraulic lines, and actuators.

The actuators, in some examples are large and heavy in relation to the size and space of the wing. In examples, the actuators that are used for actuating the control surfaces, such as ailerons, spoilers or flaps, can be so large that they do not fit into the mold line of the aircraft resulting in fairings that need to be placed on the underside of wings which cause undesirable aerodynamic effects.

In some examples, operation of the actuators includes using power from an auxiliary power unit. The auxiliary power unit, in some situations, acquires its power a primary power source. When in operation, power or electricity is distributed to many components of an aircraft. At times this power distribution is prioritized according to specific operations of the aircraft.

The inventors have recognized that minimizing or eliminating mechanical actuation can reduce weight, reduce power requirements, remove complexity, and reduce assembly and maintenance time. The inventors have recognized that using an aileron operatable by available flight energy to actuate a control surface. For example, the aileron operates to provide stress relief at the wing root during a high gravitational force, or centrifugal force, maneuver. For example, a tailored aileron deployment system, and associated assembly, that utilizes the aerodynamic load on the aileron to induce a desired angle of deflection. The angle of deflection is optionally controlled by a tailored stiffness of a biasing member. For example, the stiffness of the biasing member, is formed according to the specifics of the aircraft and the forces the aircraft is subjected to.

In an example, rotation or deflection of the aileron is controlled or managed by holding the aileron in a locked configuration and releasing the aileron to an unlocked configuration. For instance, a locking assembly is included in or proximate to the wing tip. The locking assembly is formed to retain the aileron in a stowed (e.g., original, neutral, retained) configuration or position. The locking assembly, in examples, includes a locking mechanism in communication with control systems where, upon reaching a threshold geometry, the locking mechanism releases the aileron from the stowed configuration to a rotational or dynamic configuration.

Figure 1:
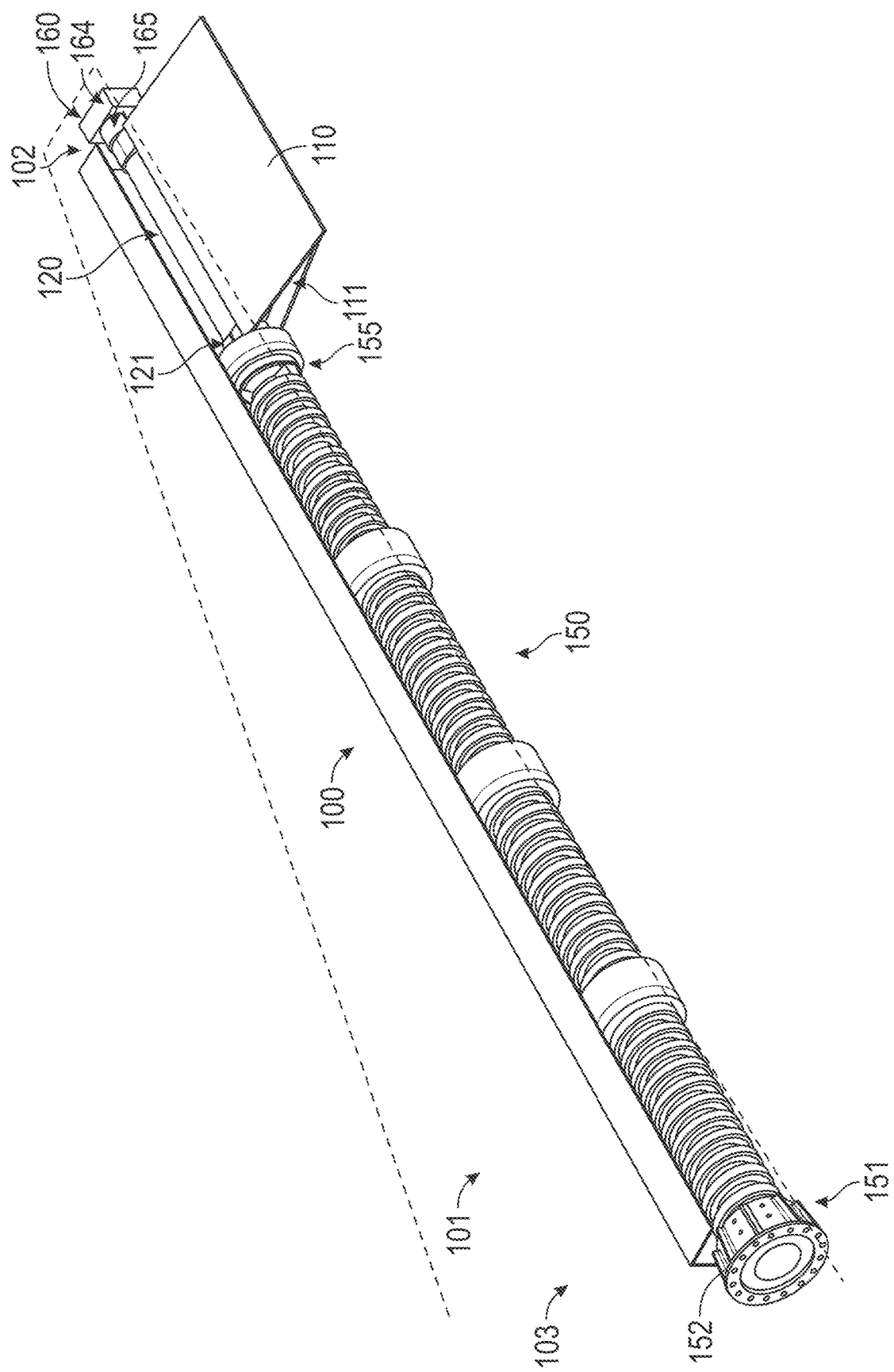
FIG. 1 illustrates an aileron control assembly according to at least one example of the present disclosure.

FIG. 1 illustrates an example tailored aileron deployment system assembly 100 of a wing 101 of an aircraft. The tailored aileron deployment system assembly 100 is housed within, for example, the wing 101 of an aircraft. The tailored aileron deployment system assembly 100 includes a series of components that cooperatively work together to control (e.g., manage, regulate, adjust or the like) the movement of an aileron 110. The aileron 110, for example, is a component of an aircraft wing that offloads forces to the aircraft at the wing 101 at the root 103 of the aircraft. For instance, the aileron 110 minimizes some of the forces applied to the wing 101 proximate to a portion of the wing 101 closest to the fuselage or proximate to a junction of the wing with the fuselage. In an example the aileron 110 is an outboard aileron, or an aileron that is proximate to the wingtip 102.

Positioning the aileron 110 proximate to the wingtip 102 allows for the aileron 110 to be formed to offload the wing 101 at the root 103. For example, when the aircraft is operating at high velocities the wing 101 are subjected to increased forces applied to the wing 101. In examples, when the aircraft is operating at velocities of greater than approximately three Earth gravitational forces (3g's), the forces applied to the wing 101 can cause the wing 101 to bend, flex or deform. For example, the forces causing the wing 101 to bend can begin at the root 103 of the wing 101. In examples, the aileron 110, positioned proximate to the wingtip 102, allows the aileron 110, when positioned at certain angles, to relieve or minimize some of the forces applied to the aileron 110 cause the wing 101 to bend.

In examples, when the aircraft enters a high velocity maneuver, the wing 101 bends and the aileron 110 is formed to react in response to the forces applied to the wing. For instance, the aileron 110 reacts gravitational forces or the centrifugal forces of the aircraft and the aileron 110 rotates, or is deflected, about the strut 120 in an effort to offload some of the pressures or forces to the wing 101. The aileron 110 relives or minimizes some of the pressure or forces applied to the wing 101 by changing the profile of the wing 101 such as changing the chord of the wing 101. Optionally, the aileron 110 is connected to internal components within the wing 101 that assist in changing the angle of the aileron 110 relative to the wing 101. For example, the aileron 110 is connected with the wing with a hinge, strut 120 or the like. The strut 120, in examples, is a component that permits rotational movement of the aileron 110 about a lateral axis of the wing 101.

In some examples, to control the aileron 110 a biasing member 150 extends from proximate to the root 103 of the wing 101 though the internal structure of the wing 101 to a position proximate to the aileron 110. The biasing member 150 is, for example, a torque tube designed to utilize aerodynamic forces to actuate control surfaces, such as the aileron 110. For instance, the biasing member 150 is a tailored torque tube that adjusts its torsional stiffness to use the aerodynamic load on the aileron 110 to induce the desired deflection. The biasing member 150 is tailored to have torsional stiffness to achieve the desired aileron 110 deflection using the aerodynamic load on the aileron 110. The biasing member 150 is a mechanical component used to transmit rotational forces from one part of an aircraft to another, such as the control systems that manage the aircraft's flight surfaces such as the aileron 110. For example, one end of the biasing member 150 is coupled to a fixed coupling 152 proximate to the root 103. The fixed coupling 152 retains the biasing member 150 in a static, or nonrotational, position at a root end 151 of the biasing member 150. The biasing member 150 extends from the root end 151 to a position proximate to, for example, a fuselage facing portion 111 of the aileron 110. In another example, the biasing member 150 extends from the root end 151 to a fuselage facing portion 121 of the strut 120. Hereinafter the portion of the biasing member 150 proximate to either the fuselage facing portion 111 or the fuselage facing portion 121 includes a second portion 155 of the biasing member 150.

In examples, the second portion 155 is rotationally coupled with the aileron 110. In an example, the second portion 155 is formed to control the movement of the aileron 110. For example, the biasing member 150 includes or is a tortional spring. In examples, the biasing member 150 is formed from composite materials that have biasing capabilities similar to a torsional spring. For example, the material selected for the biasing member 150 includes those having resilience and ability to return to its original shape after deformation, such as a unidirectional composite tape. For example, the composite material that forms the biasing member 150 is selected from materials that can withstand a twist or rotation up to approximately 45 degrees. In another example, the material selected can withstand a twist or rotation up to approximately 30 degrees. In examples, the composite material selected withstands the twist or rotation and spring back, or return, to its original configuration when a pressure or load is applied to the biasing member 150.

In examples, the biasing member 150 includes a spiral or helical form or profile that can withstand twisting, rotation, articulation or other deformation. For instance, the biasing member 150 is formed to deform, such as to twist or rotate when the biasing member 150 is subjected to dynamic movement (e.g., rotation, articulation, pivoting or the like) of the aileron 110. In other examples, a deformation of the biasing member 150 includes a change or alteration in the profile of areas of the biasing member 150 that is subjected to more or less force. For example, the deformation of the biasing member 150 includes elongation of regions of the biasing member 150 to an elongated elliptical profile from an original profile of the biasing member 150.

Figure 2:
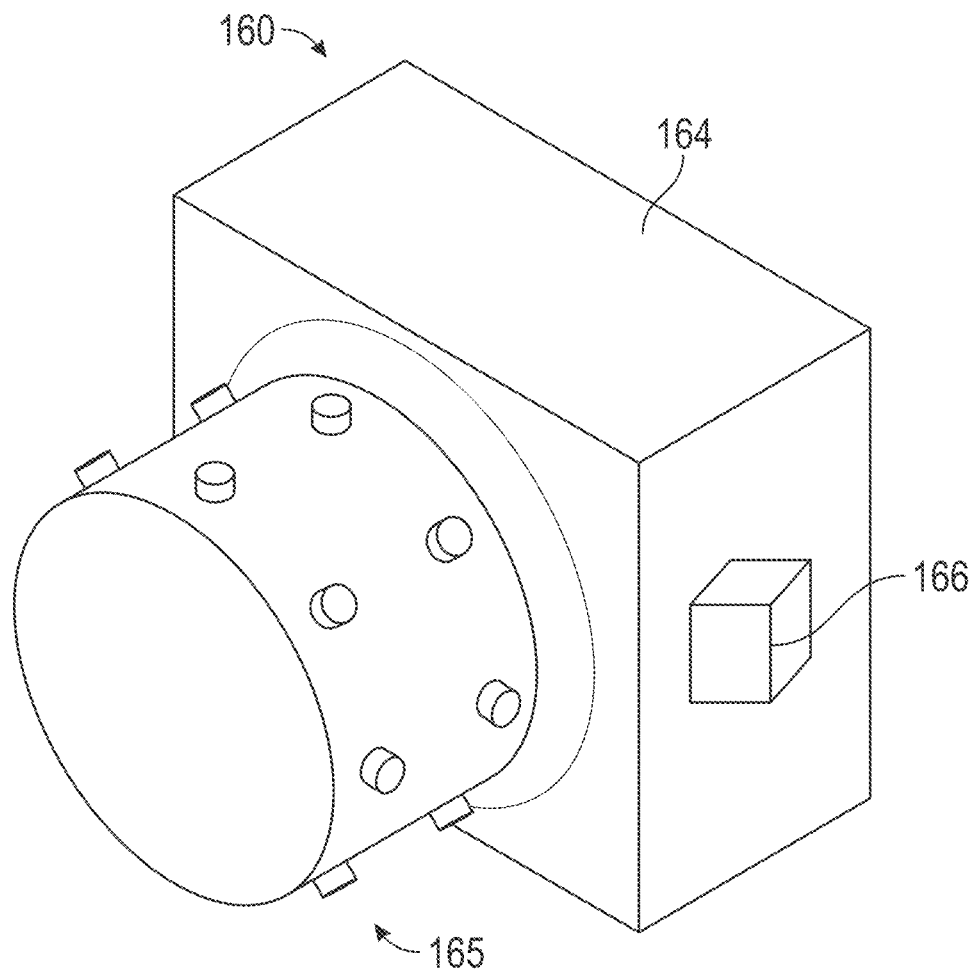
FIG. 2 illustrates a locking assembly according to at least one example of the present disclosure.
Figure 3:
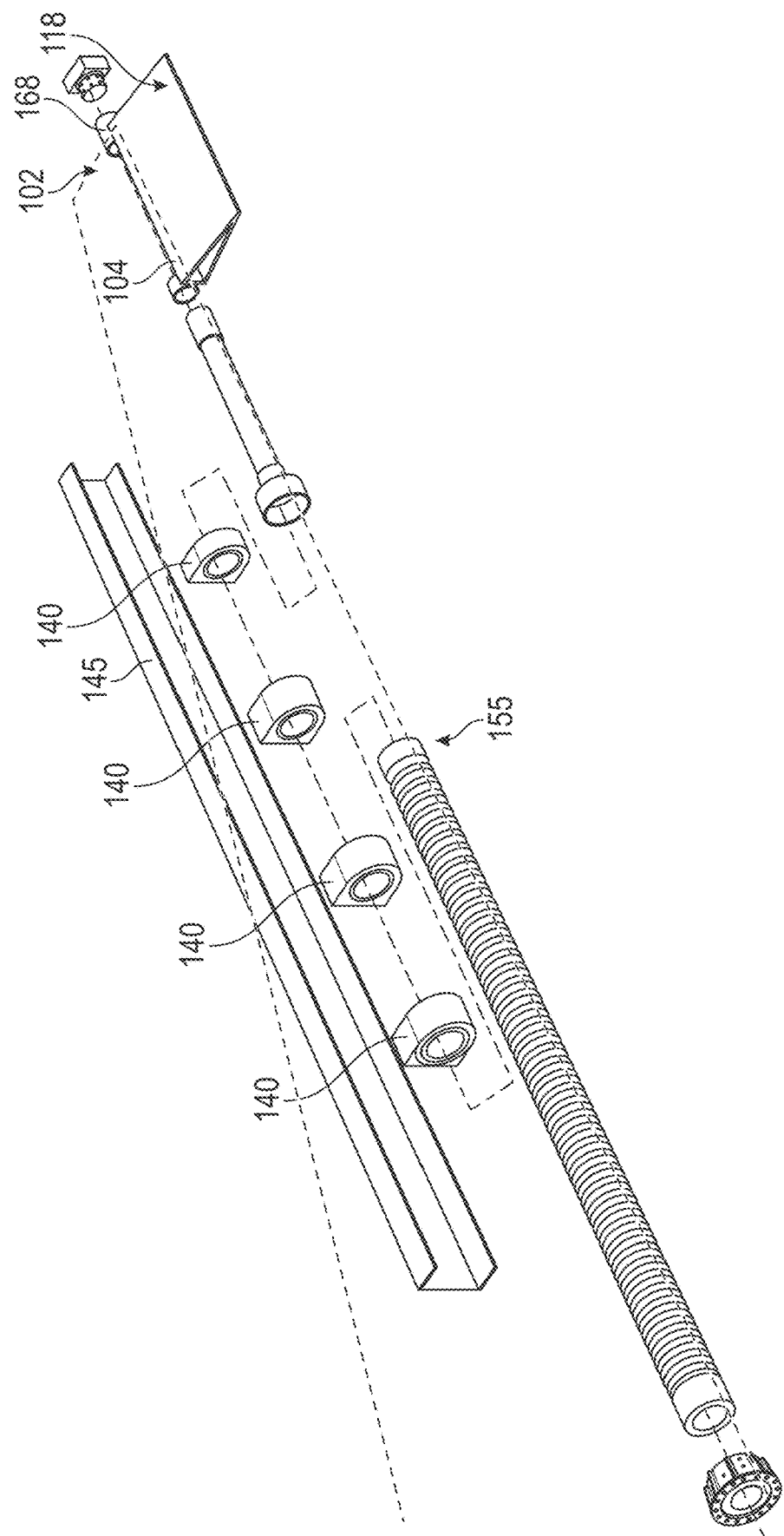
FIG. 3 illustrates an exploded view of an aileron control assembly according to at least one example of the present disclosure.

Proximate to the wingtip 102 is a locking assembly 160. As illustrated in FIG. 2, the locking assembly 160 is coupled with, for example the aileron 110 or the strut 120 (as illustrated in FIGS. 1 and 3). A lock 165, for example, retains the aileron 110 in place and can also release the aileron 110 such that the aileron 110 is able to dynamically move (e.g., rotate, articulate, pivot or the like). For example, the lock 165 is opened or disengaged, or locking components disengage from corresponding locking components associated with the aileron 110 or the strut 120.

The locking assembly 160 includes, for example, the lock 165 and can include a locking mechanism 164 that is operatively coupled with the lock 165. The locking mechanism 164 is, for example housed within the locking assembly 160. In examples, the locking mechanism 164 is designed to transition the lock 165 from a locked configuration to a released configuration. For example, in the locked configuration, the lock 165 includes components that engage with corresponding lock components of the aileron 110 or the strut 120. In another example, in the released configuration, the locking mechanism 164 opens, or unlocks, the lock 165 from the aileron 110 or the strut 120.

In an example, the locking assembly 160 includes an accelerometer 166 or other system or component that can be used to detect, sense or measure the velocity, acceleration or deceleration of the aircraft. The accelerometer 166 is in communication with the locking mechanism 164. For instance, when a specified or a threshold acceleration is measured, detected or sensed by the accelerometer 166, the accelerometer 166 communicates with the locking mechanism 164. In examples, the accelerometer 166 is coupled with a controls system that detects gravitational forces according to the acceleration. The locking mechanism 164, upon receiving a signal from the accelerometer 166, transitions the lock 165 to open, or disengage.

Illustrated in FIG. 3 is an exploded view of the components of the tailored aileron deployment system assembly. For example, beginning with the area proximate to the wingtip 102, the locking assembly 160 is positioned proximate to the wingtip 102 such that the accelerometer 166 housed within the locking assembly 160 can measure, detect or sense the acceleration or gravitational forces of the aircraft. Optionally, the accelerometer 166 is positioned in another location of the wing 101 but remains in communication with the locking mechanism 164. The lock 165 is in cooperatively engagement with a corresponding locking component 168 on a wingtip side 118 of the aileron 110.

The aileron 110 is coupled with the wing 101 proximate to the wingtip 102. For example, the aileron 110 is hinged or otherwise coupled with a trailing portion 104 of the wing 101. The aileron 110 is coupled with the wing 101 in a manner that allows the aileron 110 to rotate, pivot or take an angular configuration relative to the wing 101. For example, the strut 120 rotationally couples the aileron 110 to internal structures of the wing 101. The strut 120, hinge or the like is, for example, positioned internal to the structure of the wing 101 such as within a spar channel.

In an example, the biasing member 150 extends through the internal structure of the wing 101 and is, for example, in rotational engagement with the strut 120 or the aileron 110. For instance, the second portion 155 of the biasing member 150 retained with the strut 120 or the aileron 110. In examples, the second portion 155 is coupled with the strut 120 or the aileron 110 to transfer a rotation of the aileron 110 to the biasing member 150. The biasing member 150 is retained with, for example, one or more braces 140. The one or more braces 140 are optionally coupled with a portion of a frame of the wing 101. For example, the one or more braces 140 is coupled with a spar 145 extending through the wing 101. In an example, the one or more braces 140 are laterally spaced along a portion of the frame of the wing 101 or along the spar 145.

The biasing member 150 has a profile or form that fits within each of the one or more braces 140. For example, the one or more braces 140 has a profile that retains the biasing member 150 and allows for the biasing member 150 to deflect or change profile according to twisting, rotation or deformation of the biasing member 150.

The biasing member 150 is optionally retained proximate to the root 103 of the wing 101. The root end 151 is optionally formed to be static when the biasing member 150 twists, rotates or deforms. The biasing member 150 is deformable or rotatable along the length while being retained at the root end 151.

FIG. 4A illustrates one of the one or more braces 140 and FIG. 4B illustrates an exploded view of one of the one or more braces 140. In an example, the one or more braces 140 included a layered internal recess 141. The layered internal recess 141 includes a passage that is sized to hold or retain at least a portion of the biasing member 150 as the biasing member 150 extends through the wing 101 (as illustrated in FIGS. 1 and 3). In an example, the layered internal recess 141 includes spacing that allows for deformation of the 150. Moving from an outermost layer inward, there is for example, a bearing 142, an internal ring 143 and a deformable insert 144.

Optionally, the bearing 142 is coupled to an interior surface 140a of the one or more braces that retain the bearing 142. The bearing 142 is, for example, designed to facilitate rotation of the biasing member 150 during deformation or rotation of the biasing member 150. For example, the bearing 142 facilitates rotation by minimizing friction of the biasing member 150 against the interior surface 140a of the one or more braces 140. The bearing 142 works in cooperation with the deformable insert 144.

Figure 5A:
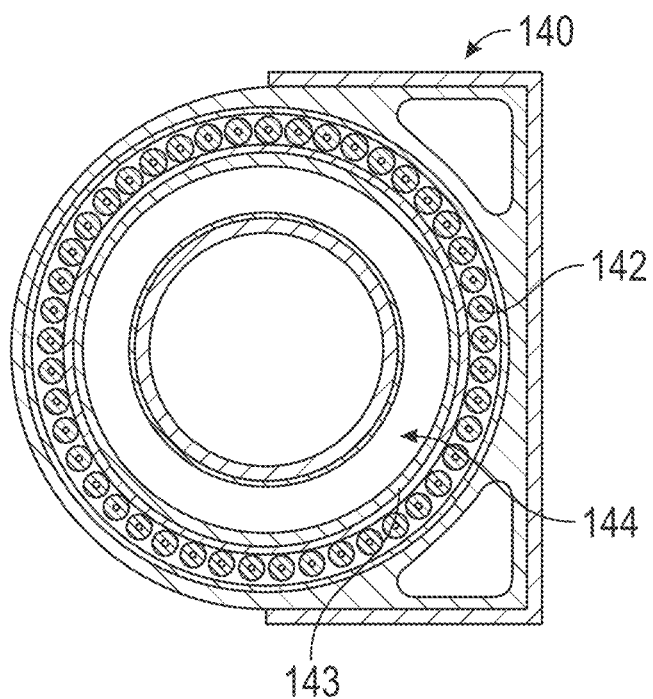
FIGS. 5A and 5B illustrates a cross section of a brace according to at least one example of the present disclosure.
Figure 5B:
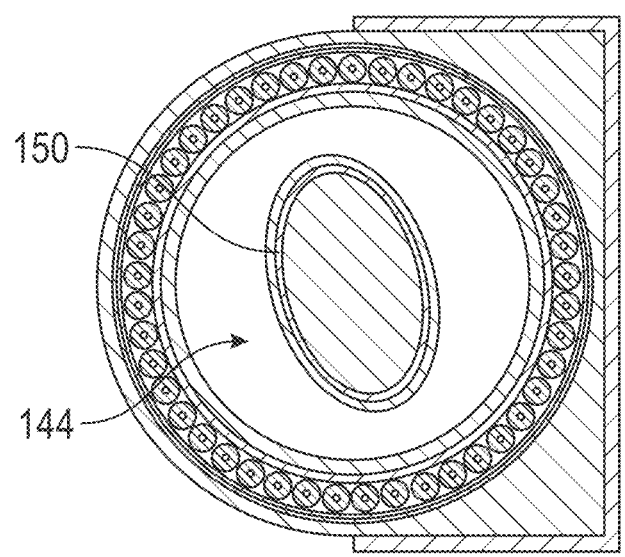

As illustrated in FIGS. 5A and 5B, the deformable insert 144 includes, for example an air pocket positioned between the internal ring 143 and the deformable insert 144. In examples, the deformable insert 144 is formed of a material that is deformable in response to changes or alterations in the profile or form of the biasing member 150 such as due to rotation or the like of the biasing member 150. In the example illustrated in FIG. 5A, the biasing member 150 is in a neutral or nondeformed orientation. The example illustrated in FIG. 5A, the deformable insert 144 is approximately evenly spaced throughout the interior of the deformable insert. For example, the distance of the deformable insert 144 between the biasing member 150 and the bearing 142 is approximately the same.

In the example illustrated in FIG. 5B, the deformable insert 144 works in cooperation with the bearing 142 to allow the biasing member 150 to rotate freely while maintaining a secure connection. As illustrated in FIG. 5B, the deformable insert 144, for example, changes its cross section to rotatably retain the biasing member 150, while also maintaining freedom of movement of the biasing member 150. For example, the distance between one point of the biasing member 150 and the bearing 142 is different than a second location.

Figure 6:
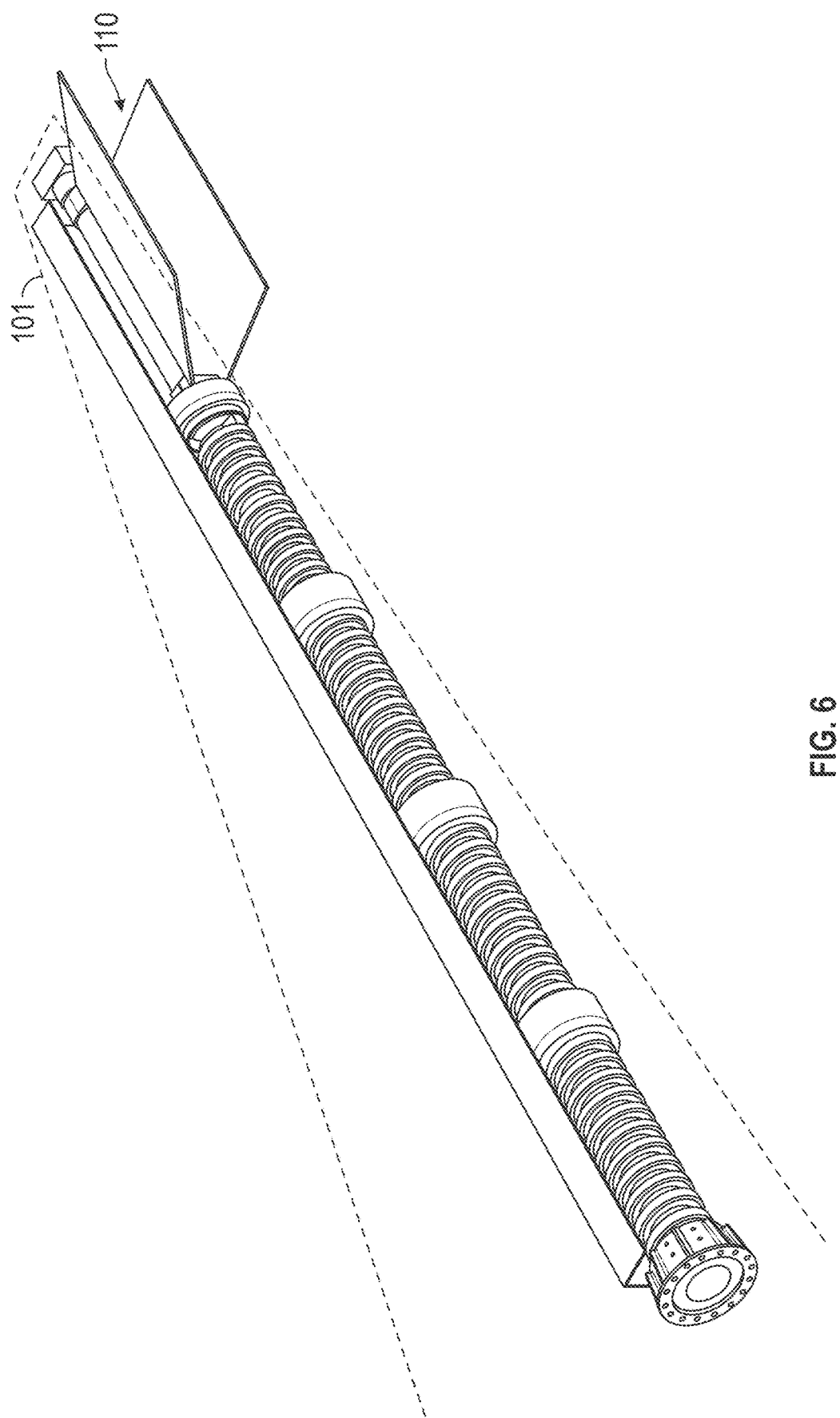
FIG. 6 illustrates an example of deflection of the aileron according to at least one example of the present disclosure.

Illustrated in FIG. 6 is an example of dynamic movement of the aileron 110. In an example, the dynamic movement of the aileron 110 includes rotating, deflecting, pivoting or the like the aileron 110 upward. For example, the aileron 110 moves in response to loads, forces or pressure applied to the wing 101. In an example, the aileron 110 moves from a stowed position, without the aileron 110 locked in position, to a rotated or deflected position.

In an example, the aileron 110 is retained in a stowed position, as illustrated in the orientation of the aileron 110 in FIG. 1. The stowed position includes, for example, the aileron 110 extending approximately continuously from the trailing portion 104 of the wing 101. In an example, the aileron 110 is statically retained to extend approximately continuously from the trailing portion 104 of the wing 101. For example, the biasing member 150 in cooperation with the aspect 11 is preloaded according to the aerodynamic design of the aircraft. For instance, the preload and a rotational stiffness are specific to the wing 101. The preload allows the aileron 110 to return to a stowed configuration when threshold forces are not applied to the wing 101.

The aileron 110 remains in the stowed configuration until, for example, the accelerometer 166, as discussed related to FIG. 2, detects, senses or measures a threshold acceleration or force. For example, during a high G rotational turn centrifugal forces the forces recognized or detected by the accelerometer 166 exceed 4 G's. This detection is communicated via a control system within the accelerometer to send a signal to unlock the locking mechanism 164. In examples, a sharp banking maneuver will put those loads on the aircraft. In other examples, during a high velocity maneuver the aircraft optionally travels at velocities where the accelerometer detects forces approximately three Earth gravitational units (3g's) to approximately seven Earth gravitational units (7g's). In an example, when the accelerometer 166 detects a threshold velocity greater than or equal to approximately 3g's, the transmits a signal to the locking mechanism 164, as a component of the locking assembly 160.

The locking mechanism 164 is, for example, operatively coupled with the accelerometer 166. When the locking mechanism 164 receives a signal from the accelerometer 166 indicating the aircraft is experiencing forces greater than a threshold value, the locking mechanism 164 transitions the lock 165 from a locked configuration (e.g., holding the aileron from in a stowed configuration) to an unlocked configuration.

In the unlocked configuration, for example, the aileron 110 is released or disengaged from the stowed configuration and the aileron 110. Optionally, the aileron 110 is free to take a dynamic configuration. In a dynamic configuration, the aileron 110 optionally dynamically moves (e.g., rotates, pivots, or articulates) a predetermined angle. For example, the aileron 110 dynamically moves (e.g., rotates, pivots or articulates) approximately between 15 and 30 degrees, as related to the stowed configuration.

In an example, the dynamic movement (e.g., rotation, pivot or articulation) is confined or limited by the biasing member 150. Optionally, the biasing member has a preloaded torsional stiffness range. In an example, the torsional stiffness controls the dynamic movement of the aileron 110. In an example, the biasing member 150 has a torsional stiffness tailored to a specified maximum angle for the aileron 110. In an example, the aileron 110 will dynamically move to offload the forces causing the wing 101 to bend to allow for structural relief.

When the accelerometer does not measure or detect the threshold acceleration or force, the accelerometer 166 optionally transmits a signal to the locking mechanism 164. For example, the locking mechanism 164 transitions the lock 165 from an unlocked configuration to a locked configuration. In an example, the lock 165 re-engages the corresponding locking component 168 (as illustrated in FIG. 3). In examples, when the lock 165 re-engages the corresponding locking component 168, the lock 165 and the corresponding locking component 168 are locked or retained together.

In examples, when the lock 165 and the corresponding locking component 168 are locked together, the aileron 110 is retained in an original orientation or position. For example, the torsional stiffness of the biasing member 150 brings the aileron 110 to the original orientation or position so the locking assembly 160 is provides a locking engagement of the aileron 110 relative to the wing 101.

Aspect 1 can include subject matter such as a tailored aileron deployment system assembly including: a locking assembly configured for coupling with an aileron of an aircraft, the locking assembly includes a lock configured for coupling with the aileron; an accelerometer configured to measure acceleration of the aircraft and detect gravitational forces; a lock mechanism operatively coupled with the lock and in communication with the accelerometer, wherein the lock mechanism is configured to transition the lock from a locked configuration to a released configuration; in the locked configuration, the lock retains the aileron in a static configuration; and in the released configuration, the lock mechanism opens the lock based on a specified acceleration measured with the accelerometer, and the lock frees the aileron to a dynamic configuration; and a biasing member coupled with the aileron, in the released configuration the biasing member controls movement of the aileron in the dynamic configuration.

Aspect 2 can include, or can optionally be combined with the subject matter of Aspect 1, to optionally include the biasing member is coupled between a wing and the aileron.

Aspect 3 can include, or can optionally be combined with the subject matter of one or any combination of Aspects 1 or 2 to optionally include the biasing member includes a torsion spring, the biasing member extending from proximate to a fuselage to a fuselage facing portion of the aileron.

Aspect 4 can include, or can optionally be combined with the subject matter of one or any combination of Aspects 1 to 3 to optionally include the biasing member is retained within one or more fittings, the one or more fittings coupled to within an aircraft wing; wherein the one or more fittings are configured to permit deformation of the biasing member.

Aspect 5 can include, or can optionally be combined with the subject matter of one or any combination of Aspects 1 to 4 to optionally include a tailored aileron deployment system assembly including the aileron.

Aspect 6 can include, or can optionally be combined with the subject matter of one or any combination of Aspects 1 to 5 to optionally include the aileron includes an outboard aileron; wherein the lock mechanism is configured to transition the lock to the released configuration when the accelerometer detects a threshold gravitational force, the threshold gravitational force includes at least three gravitational forces, relative to earth gravitational forces.

Aspect 7 can include, or can optionally be combined with the subject matter of one or any combination of Aspects 1 to 6 to optionally include the lock mechanism is configured to transition the lock to the released configuration when the accelerometer measures a specified acceleration.

Aspect 8 can include, or can optionally be combined with the subject matter of one or any combination of Aspects 1-7 to optionally include a rotational strut supporting the aileron, the rotational strut coupled with the lock mechanism on a first side of the rotational strut and the biasing member on a second side of the rotational strut; wherein the lock mechanism is configured to statically retain the rotational strut when the lock is in the locked configuration.

Aspect 8 can include subject matter such as a tailored aileron deployment system including: an aileron coupled with a trailing edge of a wing on an aircraft; the aileron having a stowed configuration and a rotation configuration; wherein in the stowed configuration the aileron continuously extends from the trailing edge of the aircraft wing and the aileron is statically retained; wherein in the rotation configuration, the aileron configured to move relative to the trailing edge of the aircraft wing; a locking assembly in communication with the aileron, a locking mechanism positioned proximate to a wing tip of the aircraft wing, the locking assembly including: a lock having a locked configuration and a released configuration; wherein in the locked configuration, the lock is configured to engage and retain the aileron in the stowed configuration; wherein in the released configuration the lock is disengaged from the aileron and the aileron enters the rotation configuration; a biasing member coupled with the aileron, the biasing member configured to control movement of the aileron in the released configuration; and an accelerometer configured to measure an acceleration of the aircraft.

Aspect 10 can include, or can optionally be combined with the subject matter of one or any combination of Aspect 9 to optionally include the accelerometer is in communication with a locking mechanism; wherein the locking mechanism is configured to transition the lock to the released configuration when the accelerometer measures a threshold acceleration.

Aspect 11 can include, or can optionally be combined with the subject matter of one or any combination of Aspects 8-10 to optionally include a tailored aileron deployment system, including the aileron; wherein the aileron is an outboard aileron.

Aspect 12 can include, or can optionally be combined with the subject matter of one or any combination of Aspects 8-10 to optionally include a tailored aileron deployment system, wherein the biasing member is coupled to at least a portion of the aircraft wing.

Aspect 13 can include, or can optionally be combined with the subject matter of one or any combination of Aspects 8-12 to optionally include one or more braces laterally spaced along a spar of the aircraft wing, the one or more braces retains the biasing member, the one or more braces including: a bearing coupled to an interior surface of the one or more braces; and a deformable insert coupled to the bearing; wherein the deformable insert is configured to deform in response to a deformation of the biasing member.

Aspect 14 can include, or can optionally be combined with the subject matter of one or any combination of Aspects 8-13 to optionally include the biasing member is a torsion spring formed from a composite material.

Aspect 15 can include, or can optionally be combined with the subject matter of one or any combination of Aspects 8-14 to optionally include a strut extending between the biasing member and the locking mechanism, the strut including: a reciprocal lock engagement configured to receive the lock when in the stowed configuration; wherein the aileron is coupled with the strut.

Aspect 16 can include subject matter such as a method for controlling movement of an aileron, the method including: retaining the aileron in a stowed position with a locking mechanism, the locking mechanism operatively coupled with the aileron; wherein in the stowed position the aileron extends continuously from a trailing end of an aircraft wing and the aileron is statically retained; measuring acceleration with an accelerometer; wherein the accelerometer is operatively coupled with the locking mechanism; wherein the accelerometer detects gravitational forces; transitioning the locking mechanism from a locked configuration to an unlocked configuration when the accelerometer detects a gravitational force at least equal to a threshold gravitational force; releasing the aileron from the stowed position to a released position when the locking mechanism is in the unlocked configuration; wherein in the released position the aileron moves according to applied forces; and controlling the movement of the aileron with a biasing member coupled with the aileron, the biasing member extending from a position proximate to a fuselage to the aileron.

Aspect 17 can include, or can optionally be combined with the subject matter of one or any combination of Aspect 16 to optionally include the threshold gravitational force is at least three gravitational forces, relative to Earth gravitational forces.

Aspect 18 can include, or can optionally be combined with the subject matter of one or any combination of Aspects 16-17 to optionally include moving the aileron includes one or rotating or pivoting the aileron relative to the aircraft wing, the method including: rotating the aileron to offload the aircraft wing.

Aspect 19 can include, or can optionally be combined with the subject matter of one or any combination of Aspects 16-18 to optionally include deforming the biasing member in response to the position of the aileron when the aileron is in the released position.

Aspect 20 can include, or can optionally be combined with the subject matter of one or any combination of Aspects 16-19 to optionally include returning the aileron to the stowed position when the gravitational force is below three gravitational forces.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A tailored aileron deployment system assembly comprising:
   a locking assembly configured for coupling with an aileron of an aircraft, the locking assembly includes a lock configured for coupling with the aileron;
   an accelerometer configured to measure acceleration of the aircraft and detect gravitational forces;
   a lock mechanism operatively coupled with the lock and in communication with the accelerometer, wherein the lock mechanism is configured to transition the lock from a locked configuration to a released configuration;
   in the locked configuration, the lock retains the aileron in a static configuration; and
   in the released configuration, the lock mechanism opens the lock based on a specified acceleration measured with the accelerometer, and the lock frees the aileron to a dynamic configuration; and
   a biasing member coupled with the aileron, in the released configuration the biasing member controls movement of the aileron in the dynamic configuration.

2. The tailored aileron deployment system assembly of claim 1, wherein the biasing member is coupled between a wing and the aileron.

3. The tailored aileron deployment system assembly of claim 1, wherein the biasing member includes a torsion spring, the biasing member extending from proximate to a fuselage to a fuselage facing portion of the aileron.

4. The tailored aileron deployment system assembly of claim 3, wherein the biasing member is retained within one or more fittings, the one or more fittings coupled to within an aircraft wing;
   wherein the one or more fittings are configured to permit deformation of the biasing member.

5. The tailored aileron deployment system assembly of claim 1 comprising the aileron.

6. The tailored aileron deployment system assembly of claim 5, wherein the aileron includes an outboard aileron;
   wherein the lock mechanism is configured to transition the lock to the released configuration when the accelerometer detects a threshold gravitational force, the threshold gravitational force includes at least three gravitational forces, relative to earth gravitational forces.

7. The tailored aileron deployment system assembly of claim 1, wherein the lock mechanism is configured to transition the lock to the released configuration when the accelerometer measures a specified acceleration.

8. The tailored aileron deployment system assembly of claim 1, including:
   a rotational strut supporting the aileron, the rotational strut coupled with the lock mechanism on a first side of the rotational strut and the biasing member on a second side of the rotational strut;
   wherein the lock mechanism is configured to statically retain the rotational strut when the lock is in the locked configuration.

9. A tailored aileron deployment system comprising:
   an aileron coupled with a trailing edge of a wing on an aircraft;
   the aileron having a stowed configuration and a rotation configuration;
   wherein in the stowed configuration the aileron continuously extends from the trailing edge of the aircraft wing and the aileron is statically retained;
   wherein in the rotation configuration, the aileron configured to move relative to the trailing edge of the aircraft wing;

a locking assembly in communication with the aileron, a locking mechanism positioned proximate to a wing tip of the aircraft wing, the locking assembly including:
    a lock having a locked configuration and a released configuration;
        wherein in the locked configuration, the lock is configured to engage and retain the aileron in the stowed configuration;
        wherein in the released configuration the lock is disengaged from the aileron and the aileron enters the rotation configuration;
    a biasing member coupled with the aileron, the biasing member configured to control movement of the aileron in the released configuration; and
    an accelerometer configured to measure an acceleration of the aircraft.

10. The tailored aileron deployment system of claim 9, wherein the accelerometer is in communication with a locking mechanism;
    wherein the locking mechanism is configured to transition the lock to the released configuration when the accelerometer measures a threshold acceleration.

11. The tailored aileron deployment system of claim 9, comprising the aileron;
    wherein the aileron is an outboard aileron.

12. The tailored aileron deployment system of claim 9, wherein the biasing member is coupled to at least a portion of the aircraft wing.

13. The tailored aileron deployment system of claim 9, including:
    one or more braces laterally spaced along a spar of the aircraft wing, the one or more braces retains the biasing member, the one or more braces including:
        a bearing coupled to an interior surface of the one or more braces; and
        a deformable insert coupled to the bearing;
            wherein the deformable insert is configured to deform in response to a deformation of the biasing member.

14. The tailored aileron deployment system of claim 9, wherein the biasing member is a torsion spring formed from a composite material.

15. The tailored aileron deployment system of claim 9, including:
    a strut extending between the biasing member and the locking mechanism, the strut including:
        a reciprocal lock engagement configured to receive the lock when in the stowed configuration;
    wherein the aileron is coupled with the strut.

16. A method for controlling movement of an aileron, the method comprising:
    retaining the aileron in a stowed position with a locking mechanism, the locking mechanism operatively coupled with the aileron;
        wherein in the stowed position the aileron extends continuously from a trailing end of an aircraft wing and the aileron is statically retained;
    measuring acceleration with an accelerometer;
        wherein the accelerometer is operatively coupled with the locking mechanism;
        wherein the accelerometer detects gravitational forces;
    transitioning the locking mechanism from a locked configuration to an unlocked configuration when the accelerometer detects a gravitational force at least equal to a threshold gravitational force;
    releasing the aileron from the stowed position to a released position when the locking mechanism is in the unlocked configuration;
        wherein in the released position the aileron moves according to applied forces; and
    controlling the movement of the aileron with a biasing member coupled with the aileron, the biasing member extending from a position proximate to a fuselage to the aileron.

17. The method for controlling the movement of claim 16, wherein the threshold gravitational force is at least three gravitational forces, relative to Earth gravitational forces.

18. The method for controlling the movement of claim 16, wherein moving the aileron includes one or rotating or pivoting the aileron relative to the aircraft wing, the method including:
    rotating the aileron to offload the aircraft wing.

19. The method for controlling the movement of claim 16, including:
    deforming the biasing member in response to the position of the aileron when the aileron is in the released position.

20. The method for controlling the movement of claim 16, including:
    returning the aileron to the stowed position when the gravitational force is below three gravitational forces.

* * * * *